US008360220B2

(12) United States Patent
Shimizu et al.

(10) Patent No.: US 8,360,220 B2
(45) Date of Patent: Jan. 29, 2013

(54) POWER TRANSMISSION DEVICE AND VEHICLE HAVING THE SAME

(75) Inventors: Tetsuya Shimizu, Anjo (JP); Kazuhiko Kato, Kariya (JP); Kenichi Tsuchida, Hazugun (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 491 days.

(21) Appl. No.: 12/654,641

(22) Filed: Dec. 28, 2009

(65) Prior Publication Data

US 2010/0193315 A1  Aug. 5, 2010

(30) Foreign Application Priority Data

Jan. 30, 2009 (JP) ................................. 2009-020733

(51) Int. Cl.
*F16H 61/00* (2006.01)
(52) U.S. Cl. ...................... 192/85.63; 417/288; 475/137
(58) Field of Classification Search .................. 475/101, 475/137
See application file for complete search history.

(56) References Cited

U.S. PATENT DOCUMENTS

| 7,163,481 | B2 * | 1/2007 | Takagi et al. ................ 192/3.57 |
| 2007/0021261 | A1 | 1/2007 | Morise et al. | |
| 2010/0181159 | A1 * | 7/2010 | Shimizu et al. ............ 192/85.63 |
| 2010/0193313 | A1 * | 8/2010 | Shimizu et al. ................ 192/3.3 |
| 2011/0088990 | A1 * | 4/2011 | Shimizu et al. ............ 192/85.01 |

FOREIGN PATENT DOCUMENTS

| JP | A-2000-046166 | 2/2000 |
| JP | A 2000-356148 | 12/2000 |
| JP | A 2001-182814 | 7/2001 |
| JP | A 2002-130449 | 5/2002 |
| JP | A 2002-168330 | 6/2002 |
| JP | A 2002-195399 | 7/2002 |
| JP | A 2006-348997 | 12/2006 |
| JP | A 2007-24231 | 2/2007 |
| JP | A-2008-180303 | 8/2008 |

OTHER PUBLICATIONS

International Search Report mailed Apr. 13, 2010 for PCT/JP2009/071247.
Partial English translation of Jul. 24, 2012 Office Action issued in Japanese Patent Application No. 2009-020733.

* cited by examiner

*Primary Examiner* — Rodney Bonck
(74) *Attorney, Agent, or Firm* — Oliff & Berridge, PLC

(57) ABSTRACT

A power transmission device includes a clutch that transmits power from a motor to an axle; a first pump that is driven by power from the motor to generate and output fluid pressure; a second pump that receives and is driven by a supply of electric power to generate and output fluid pressure; a pressure regulating valve that functions as a linear solenoid valve and is formed with an input port, an output port that is connected to the clutch, and a drain port; and a switching valve that switches between a first connection state.

5 Claims, 3 Drawing Sheets

F I G . 1
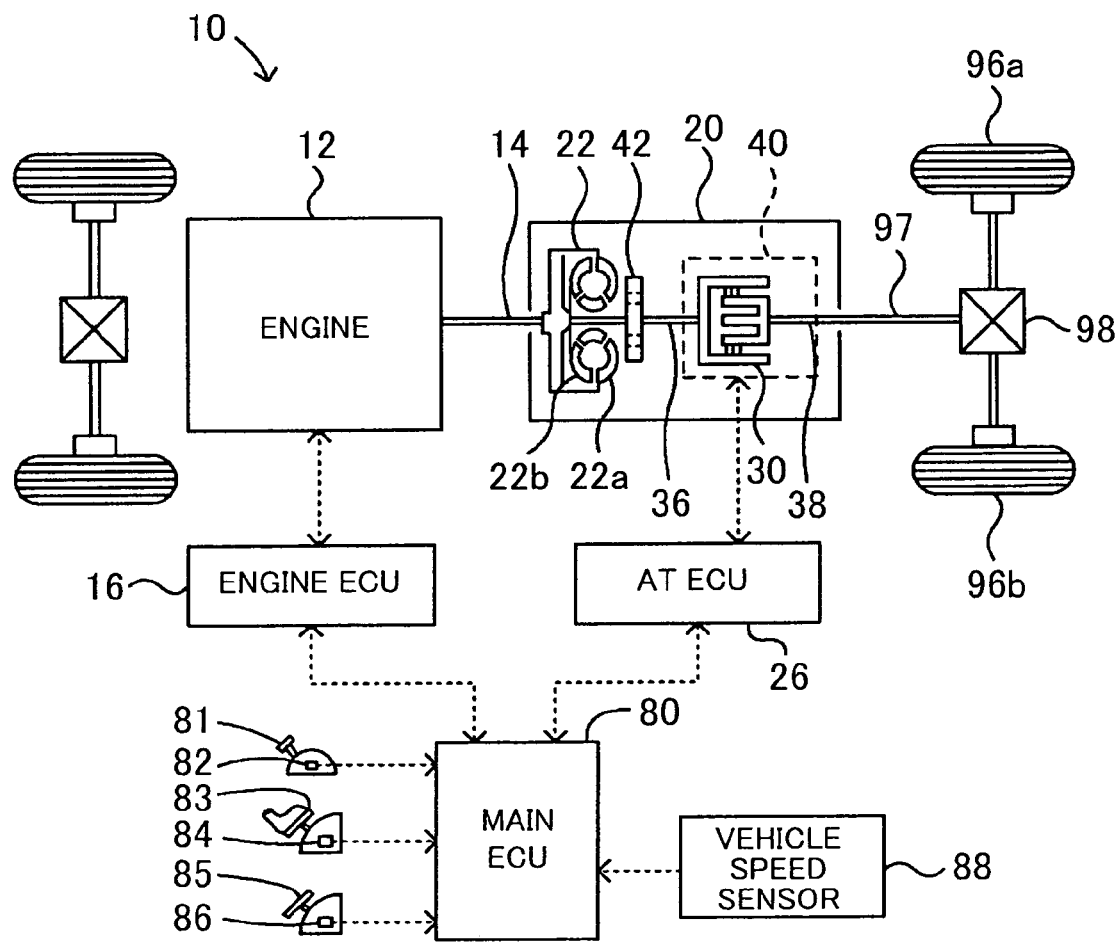

|  |  | C1 | C2 | C3 | B1 | B2 | B3 | B4 | F1 | F2 | F3 |
|---|---|----|----|----|----|----|----|----|----|----|----|
|  | P |  |  |  |  |  |  |  |  |  |  |
|  | R |  |  | O | (O) |  |  | O | O |  |  |
|  | N |  |  |  |  |  |  |  |  |  |  |
| D | 1st | O |  |  |  |  | (O) |  |  |  | O |
|  | 2nd | O |  |  |  | (O) | O |  | O | O |  |
|  | 3rd | O |  | O | (O) |  | ● |  | O |  |  |
|  | 4th | O | O | ● |  |  | ● |  |  |  |  |
|  | 5th |  | O | O | O |  | ● |  |  |  |  |

(O): ENGINE BRAKE IN OPERATION
● : ENGAGED BUT NO TORQUE TRANSMITTED

POWER TRANSMISSION DEVICE AND VEHICLE HAVING THE SAME

INCORPORATION BY REFERENCE

The disclosure of Japanese Patent Application No. 2009-020733 filed on Jan. 30, 2009 including the specification, drawings and abstract is incorporated herein by reference in its entirety.

BACKGROUND

The present invention relates to a power transmission device that is installed in a vehicle and provided with a clutch that transmits power from a motor to an axle, and a vehicle having the power transmission device.

This type of power transmission device conventionally has a first hydraulic pump (mechanical oil pump) that drives based on power from an engine; a manual shift valve that operates in association with a shift operation; a solenoid valve whose input port is connected to the first hydraulic pump through the manual shift valve; a selector valve that is interposed between oil passages and formed as a two-position electromagnetic valve (and includes a check valve), wherein at a first position the selector valve communicates with an oil passage that is interposed between and connects an output port of the solenoid valve to a friction engaging device (clutch) and at a second position the selector valve cuts off this oil passage; and a second hydraulic pump (electromagnetic pump) that directly delivers discharge pressure to the clutch. (See Japanese Patent Application Publication No. JP-A-2008-180303 for an example.)

SUMMARY

In the power transmission device described above, if some abnormality (such as the penetration of foreign matter) causes the selector valve to stick (lock) while the selector valve has cut off the connection between the output port of the solenoid valve and the clutch, hydraulic pressure acting on the clutch may become trapped. In general hydraulic pressure from the hydraulic pump is not delivered to the clutch because hydraulic pressure from the hydraulic pump is cut off by the manual shift valve when shifting is performed to the neutral position. In the case described above, even if the manual shift valve cuts off hydraulic pressure from the hydraulic pump as a result of shifting performed to the neutral position, the clutch remains engaged due to residual pressure and unexpected power from the engine may be transmitted to the axle. Because sticking of the selector valve in the state described above also means that required hydraulic pressure cannot be supplied to the clutch, transmitting power to the axle becomes difficult.

The power transmission device and the vehicle having the same of the present invention suitably counteract an abnormality of a switching valve that switches routes for supplying fluid pressure to a clutch in order to increase the reliability of the device.

The power transmission device and the vehicle having the same of the present invention employ the following to achieve the above.

A power transmission device of the present invention is installed in a vehicle. The power transmission device includes: a clutch that transmits power from a motor to an axle; a first pump that is driven by power from the motor to generate and output fluid pressure; a second pump that receives and is driven by a supply of power to generate and output fluid pressure; a pressure regulating valve that functions as a linear solenoid valve and is formed with an input port, an output port that is connected to the clutch, and a drain port; and a switching valve that switches between a first connection state, wherein when the first pump is driving, operation fluid output from the first pump is supplied to the input port of the pressure regulating valve and a supply of operation fluid from the second pump to the input port of the pressure regulating valve is cut off, and a second connection state wherein, when the first pump is not driving, the supply of operation fluid from the first pump to the input port of the pressure regulating valve is cut off and operation fluid output from the second pump is supplied to the input port of the pressure regulating valve.

According to the power transmission device of the present invention, the pressure regulating valve functions as a linear solenoid valve, and is formed from an input port, an output port that is connected to the clutch, and a drain port. The switching valve switches between the first and second connection states. In the first connection state, when the first pump that drives by power from the motor is driving, operation fluid output from the first pump is supplied to the input port of the pressure regulating valve and a supply of operation fluid from the second pump, which drives by receiving a supply of electricity, to the input port of the pressure regulating valve is cut off. In the second connection state, when the first pump is not driving, the supply of operation fluid from the first pump to the input port of the pressure regulating valve is cut off and operation fluid output from the second pump is supplied to the input port of the pressure regulating valve. Thus, even when the switching valve sticks (locks) in the second connection state due to some abnormality, de-energizing the pressure regulating valve puts the output port and the drain port in communication such that fluid pressure acting on the clutch can be drained from the drain port. Accordingly, even when a shift operation is made to the neutral position while the switching valve is stuck, the pressure regulating valve is normally de-energized in the neutral position to enable the drainage of fluid pressure acting on the clutch. It is thus possible to suppress a transmission of power from the motor to the axle that is unexpected by the driver. Consequently, an abnormality of the switching valve can be suitably counteracted to increase the reliability of the device. By driving the second pump while the first pump is stopped in connection with stopping of the motor, fluid pressure from the second pump acts on the clutch. Therefore, when the motor subsequently restarts, the clutch can be rapidly engaged. Here, in addition to including an internal combustion engine capable of an automatic stop and an automatic start, the term "motor" also includes an electric motor capable of power output for travel. In addition to including a normal clutch that connects two rotating systems, the term "clutch" includes a brake that connects one rotating system to a fixing system such as a case. The term "second pump" includes a normal electric pump that is driven by power from an electric motor to generate fluid pressure, as well as an electromagnetic pump or the like that generates fluid pressure by reciprocating a mobile part using electromagnetic force or the biasing force of a spring.

The power transmission device of the present invention described above may further include a bypass valve that supplies operation fluid output from the first pump to the input port of the pressure regulating valve without going through the switching valve. Thus, even if the switching valve becomes stuck in the second connection state due to some abnormality, fluid pressure can be supplied to the clutch to enable the transmission of power from the motor to the axle. Consequently, even when the switching valve is locked, an emergency maneuver such as stopping the vehicle on the road shoulder, for example, can be performed. An abnormality of the switching valve can thus be suitably counteracted to further increase the reliability of the device.

In the power transmission device of the present invention, the switching valve may include: a signal pressure input port that is input with operation fluid output from the first pump as a signal pressure; a first input port that is input with operation fluid output from the first pump; a second input port that is input with operation fluid output from the second pump; and an output port that is connected to the input port of the pressure regulating valve and outputs operation fluid. When operation fluid is input to the signal pressure input port, as the first connection state, the first input port communicates with the output port, and communication between the second input port and the output port is cut off. When operation fluid is not input to the signal pressure input port, as the second connection state, communication between the first input port and the output port is cut off, and the second input port communicates with the output port.

A vehicle of the present invention is installed with a motor and a power transmission device of the present invention of any of the modes described above. Namely, the vehicle is basically installed with a power transmission device having a clutch that transmits power from the motor to an axle. The power transmission device further includes: a first pump that is driven by power from the motor to generate and output fluid pressure; a second pump that receives and is driven by a supply of power to generate and output fluid pressure; a pressure regulating valve that functions as a linear solenoid valve and is formed with an input port, an output port that is connected to the clutch, and a drain port; and a switching valve that switches between a first connection state, wherein when the first pump is driving, operation fluid output from the first pump is supplied to the input port of the pressure regulating valve and a supply of operation fluid from the second pump to the input port of the pressure regulating valve is cut off, and a second connection state wherein, when the first pump is not driving, the supply of operation fluid from the first pump to the input port of the pressure regulating valve is cut off and operation fluid output from the second pump is supplied to the input port of the pressure regulating valve.

The vehicle of the present invention is provided with the power transmission device of the present invention of any of the modes described above. Therefore, effects achieved by the power transmission of the present invention, for example, an effect of suitably counteracting an abnormality of the switching valve to increase the reliability of the device and an effect of rapidly engaging the clutch at restarting of the motor after an automatic stop to swiftly start power transmission, can be achieved by the vehicle of the present invention.

BRIEF DESCRIPTION OF THE DRAWINGS

FIG. 1 is a structural diagram that shows an outline of the constitution of an automobile 10 incorporated with a power transmission device 20 serving as an embodiment of the present invention;

DETAILED DESCRIPTION OF EMBODIMENTS

Next, an embodiment will be used to describe a best mode for carrying out the present invention.

Figures 2, 3:
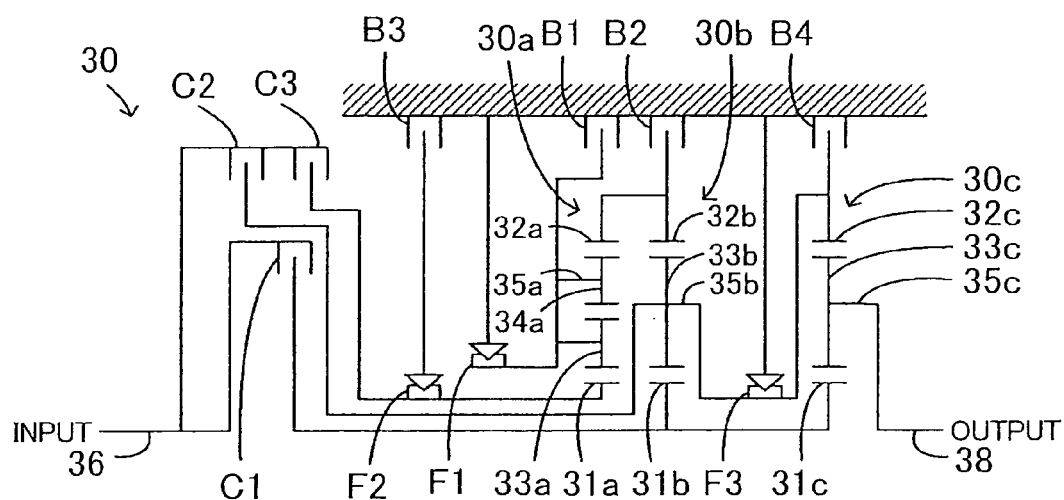
FIG. 2 is a structural diagram that shows an outline of the constitution of an automatic transmission 30 provided in the power transmission device 20 of the embodiment.
FIG. 3 is an explanatory drawing that shows an operation chart of the automatic transmission 30.
Figure 4:
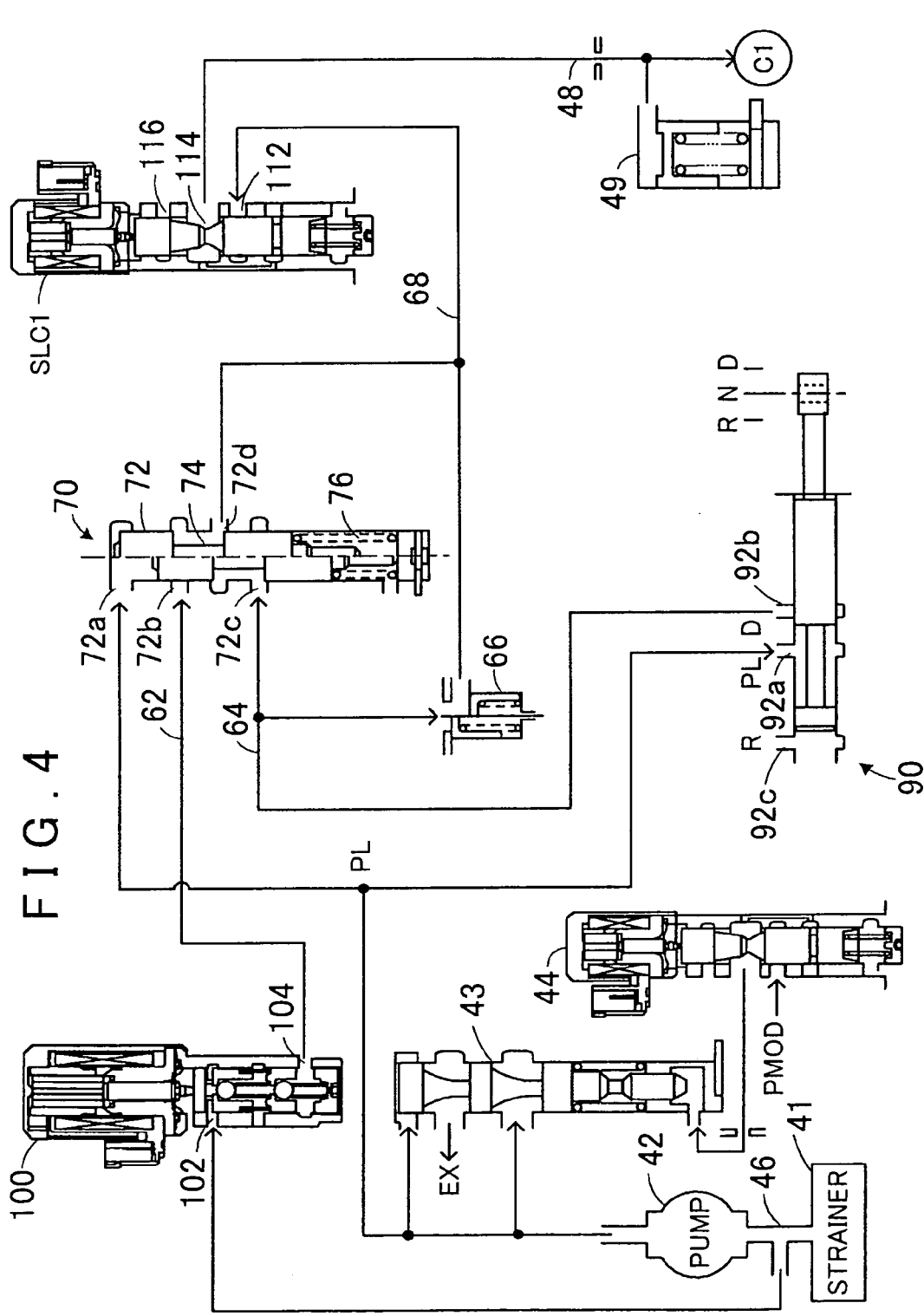
FIG. 4 is a structural diagram that shows an outline of the constitution of a hydraulic circuit 40.

FIG. 1 is a structural diagram that shows an outline of the constitution of a vehicle 10 incorporated with a power transmission device 20 serving as an embodiment of the present invention. FIG. 2 is a structural diagram that shows an outline of the constitution of an automatic transmission 30 provided in the power transmission device 20. FIG. 3 is an explanatory drawing that shows an operation chart of the automatic transmission 30. FIG. 4 is a structural diagram that shows an outline of the constitution of a hydraulic circuit 40 that drives the automatic transmission 30.

As FIG. 1 shows, the vehicle 10 of the present embodiment includes an engine 12, an engine electronic control unit (engine ECU) 16, and a power transmission device 20. The engine 12 is an internal combustion engine that outputs power by explosive combustion of a hydrocarbon fuel such as gasoline or diesel. The engine ECU 16 operates and controls the engine 12. The power transmission device 20 of the embodiment is connected to a crankshaft 14 of the engine 12, as well as to a drive shaft 97 connected to right and left wheels 96a, 96b through a differential gear 98, and transmits power from the engine 12 to the drive shaft 97.

As FIG. 1 further shows, the power transmission device 20 of the embodiment is formed as a transaxle device that transmits power from the engine 12 to the drive shaft 97, and includes a torque converter 22, a mechanical oil pump 42, the automatic transmission 30, the hydraulic circuit 40, an automatic transmission electronic control unit (AT ECU) 26, and a main electronic control unit (main ECU) 80. The torque converter 22 has a lock-up clutch and is formed from a pump impeller 22a, which is connected to the crankshaft 14 of the engine 12, and a turbine runner 22b, which is connected to an input shaft 36 of the automatic transmission 30 and disposed facing the pump impeller 22a. The mechanical oil pump 42 is disposed downstream of the torque converter 22 and pressure feeds operation oil based on the power from the engine 12. The automatic transmission 30 is staged and driven by hydraulic pressure. In addition, the automatic transmission 30 has the input shaft 36 connected to the turbine runner 22b of the torque converter 22 and an output shaft 38 that is connected to the drive shaft 97. The automatic transmission changes the speed of power input to the input shaft 36, which it then outputs to the output shaft 38. The hydraulic circuit 40 is an actuator that drives the automatic transmission 30. The AT ECU 29 controls the automatic transmission 30 (hydraulic circuit 40). The main electronic control unit 80 controls the vehicle overall. Note that the main electronic control unit 80 is input with a shift position SP from a shift position sensor 82 that detects an operation position of a shift lever 81; and accelerator opening Acc from an accelerator pedal position sensor 84 that detects a depression amount of an accelerator pedal 83; a brake switch signal BSW from a brake switch 86 that detects depression of a brake pedal 85; and a vehicle speed V from a vehicle speed sensor 88. The main electronic control unit 80 is also connected to the engine ECU 16 and the AT ECU 26 through communication ports, and exchanges various control signals and data with the engine ECU 16 and the AT ECU 26.

As shown in FIG. 2, the automatic transmission 30 has a double-pinion type planetary gear mechanism 30a; two single-pinion type planetary gear mechanisms 30b, 30c; three clutches C1, C2, C3; four brakes B1, B2, B3, B4; and three one-way clutches F1, F2, F3. The double-pinion type planetary gear mechanism 30a has a sun gear 31a with external teeth; a ring gear 32a with internal teeth that is disposed concentrically with respect to the sun gear 31a; a plurality of first pinion gears 33a that mesh with the sun gear 31a; a plurality of second pinion gears 34a that mesh with the plurality of first pinion gears 33a and also mesh with the ring gear 32a; and a carrier 35a that is connected to and also rotatably and revolvably holds the plurality of first pinion gears 33a and the plurality of second pinion gears 34a. The sun gear 31a is connected to the input shaft 36 through the clutch C3. The sun gear 31a is also connected to the brake B3 through the one-way clutch F2, and the rotation of the sun gear 31a is permitted or held stationary by engaging and disengaging the brake B3. The rotation of the ring gear 32a is permitted or held stationary by engaging and disengaging the brake B2. The carrier 35a is restricted to rotation in one direction by the one-way clutch F1, and the rotation of the carrier 35a is permitted or held stationary by engaging and disengaging the brake B1. The single-pinion type planetary gear mechanism 30b has a sun gear 31b with external teeth; a ring gear 32b with internal teeth that is disposed concentrically with respect to the sun gear 31b; a plurality of pinion gears 33b that mesh with the sun gear 31b and the ring gear 32b; and a carrier 35b that rotatably and revolvably holds the plurality of pinion gears 33b. The sun gear 31b is connected to the input shaft 36 through the clutch C1. The ring gear 32b is connected to the ring gear 32a of the double-pinion type planetary gear mechanism 30a, and the rotation of the ring gear 32b is permitted or held stationary by engaging and disengaging the brake B2. The carrier 35b is connected to the input shaft 36 through the clutch C2, and the carrier 35b is restricted to rotation in one direction by the one-way clutch F3. The single-pinion type planetary gear mechanism 30c has a sun gear 31c with external teeth; a ring gear 32c with internal teeth that is disposed concentrically with respect to the sun gear 31c; a plurality of pinion gears 33c that mesh with the sun gear 31c and the ring gear 32c; and a carrier 35c that rotatably and revolvably holds the plurality of pinion gears 33c. The sun gear 31c is connected to the sun gear 31b of the single-pinion type planetary gear mechanism 30b. The ring gear 32c is connected to the carrier 35b of the single-pinion type planetary gear mechanism 30b, and the rotation of the ring gear 32c is permitted or held stationary by engaging and disengaging the brake B4. The carrier 35c is connected to the output shaft 38.

As shown in FIG. 3, the automatic transmission 30 can switch among first to fifth forward speeds, one reverse speed, and neutral by engaging and disengaging the clutches C1 to C3 and the brakes B1 to B4. The first forward speed, namely the state of decelerating the rotation of the input shaft 36 at the largest reduction ratio and transmitting such rotation to the output shaft 38, is formed by engaging the clutch C1, and disengaging the clutches C2, C3 and the brakes B1 to B4. In the first forward speed, the brake B4 is engaged during engine braking. The second forward speed is formed by engaging the clutch C1 and the brake B3, and disengaging the clutches C2, C3 and the brakes B1, B2, B4. In the second forward speed, the brake B2 is engaged during engine braking. The third forward speed is formed by engaging the clutches C1, C3 and the brake B3, and disengaging the clutch C2 and the brakes B1, B2, B4. In the third forward speed, the brake B1 is engaged during engine braking. The fourth forward speed is formed by engaging the clutches C1 to C3 and the brake B3, and disengaging the brakes B1, B2, B4. The fifth forward speed, namely the state of decelerating (accelerating) the rotation of the input shaft 36 at the smallest reduction ratio and transmitting such rotation to the output shaft 38, is formed by engaging the clutches C2, C3 and the brakes B1, B3, and disengaging the clutch C1 and the brakes B2, B4. Neutral in the automatic transmission 30, namely the state of uncoupling the input shaft 36 and the output shaft 38, is achieved by disengaging all the clutches C1 to C3 and the brakes B1 to B4. The reverse speed is formed by engaging the clutch C3 and the brake B4, and disengaging the clutches C1, C2 and the brakes B1 to B3.

Engaging and disengaging of the clutches C1 to C3 and the brakes B1 to B4 of the automatic transmission 30 is performed by the hydraulic circuit 40. As shown in FIG. 4, the hydraulic circuit 40 includes: a regulator valve 43, a linear solenoid 44, a manual valve 90, an electromagnetic pump 100, a switching valve 70, a bypass valve 66, a linear solenoid SLC1 and an accumulator 49. The regulator valve 43 regulates the pressure (a line pressure PL) of operation oil pressure fed from the mechanical oil pump 42, which is driven by power from the engine 12, through a strainer 41. The linear solenoid 44 regulates a modulator pressure PMOD that is generated from the line pressure PL through a modulator valve (not shown) and outputs the modulator pressure PMOD as a signal pressure. The manual valve 90 is formed with an input port 92a that is input with the line pressure PL, a Drive-position (D-position) output port 92b, and a Reverse-position (R-position) output port 92c, and the like. The manual valve 90 opens and closes each port in association with the operation of the shift lever 81. The electromagnetic pump 100 intakes operation oil through an intake port 102 from an oil passage 46 between the strainer 41 and the mechanical oil pump 42, and discharges from a discharge port 104 that is connected to an oil passage 62. The switching valve 70 operates by input of the line pressure PL and selectively switches between the following two states: a state in which operation oil output from the D-position output port 92b of the manual valve 90 is input to the switching valve 70 through an oil passage 64 and then delivered to an oil passage 68; and a state in which operation oil from the electromagnetic pump 100 is input to the switching valve 70 through the oil passage 62 and then delivered to the oil passage 68. The bypass valve 66 bypasses the switching valve 70 and supplies operation oil output to the oil passage 64 from the D-position output port 92b of the manual valve 90 to the oil passage 68. The linear solenoid SLC1 is input with operation oil that is supplied to the oil passage 68 through an input port 112. By adjusting a discharge amount from a drain port 116, the linear solenoid SLC1 regulates the pressure of the operation oil and outputs the operation oil through an output port 114. The accumulator 49 is linked to the oil passage 48 that is connected to the clutch C1, and accumulates hydraulic pressure that acts on the clutch C1. Here, the linear solenoid SLC1 is formed as a normally-closed linear solenoid valve for direct control, which can directly control the clutch C1 by regulating the line pressure PL input through the manual valve 90 to an optimal clutch pressure for engaging the clutch C1. Therefore, the linear solenoid SLC1 is energized in the first to fourth forward speeds where the clutch C1 is engaged, and the linear solenoid SLC1 is de-energized in Neutral (N) and the fifth forward speed where the clutch C1 is not engaged. When the linear solenoid SLC1 is de-energized, the input port 112 is closed and the output 114 communicates with the drain port 116. Note that FIG. 4 only shows the hydraulic system of the clutch C1, and does not show the hydraulic systems for the other clutches C2, C3 or the brakes B1 to B4 because they are not central to the present invention. These hydraulic systems may be configured using common linear solenoids or the like.

The switching valve 70 is formed from a sleeve 72, a spool 74 that slides in the axial direction inside the sleeve 72, and a spring 76 that biases the spool 74 in the axial direction. The sleeve 72 is formed with the following ports: a signal pressure input port 72a that is input with the line pressure PL as a signal pressure; an input port 72b that is connected to the discharge port 104 of the electromagnetic pump 100 through the oil passage 62; an input port 72c that is connected to the D-position output port 92b of the manual valve 90 through the oil passage 64; and an output port 72d that is connected to the input port 112 of the linear solenoid SLC1 through the oil passage 68. When the line pressure PL is input to the signal pressure input port 72a of the switching valve 70, the spool 74 overcomes the biasing force of the spring 76 to move to the position shown in the left-hand region of the figure and closes the input port 72b. Consequently, the input port 72c communicates with the output port 72d. Thus, the oil passage 64 of the D-position output port 92b of the manual valve 90 communicates with the oil passage 68 of the input port 112 of the linear solenoid SLC1, and communication between the oil passage 62 of the discharge port 104 of the electromagnetic pump 100 and oil passage 68 of the input port 112 of the linear solenoid SLC1 is cut off. When the line pressure PL is not input to the signal pressure input port 72a, the biasing force of the spring 76 causes the spool 74 to move to the position shown in the right-hand region of the figure and closes the input port 72c. Consequently, the input port 72b communicates with the output port 72d. Thus, the oil passage 62 of the discharge port 104 of the electromagnetic pump 100 communicates with the oil passage 68 of the input port 112 of the linear solenoid SLC1, communication is cut off between the oil passage 64 of the D-position output port 92b of the manual valve 90 and the oil passage 68 of the input port 112 of the linear solenoid SLC1.

Furthermore, when the vehicle 10 of the embodiment thus formed is running with the shift lever 81 in the Drive (D) running position, the engine 12 automatically stops when all preset automatic stop conditions are satisfied. Such automatic stop conditions include the vehicle speed V being zero, the accelerator off, and the brake switch signal BSW on. Once the engine 12 automatically stops, if preset automatic start conditions such as the brake switch signal BSW being off are subsequently satisfied, the automatically stopped engine 12 is automatically started.

When the automatic stop conditions are satisfied in the vehicle 10 of the embodiment and the engine 12 automatically stops, the mechanical oil pump 42 also stops accordingly. Therefore, the line pressure PL escapes and the spool 74 of the switching valve 70 cuts off communication between the oil passage 64 of the D-position output port 92b of the manual valve 90 and the oil passage 68 of the input port 112 of the linear solenoid SLC1, and communicates the oil passage 62 of the discharge port 104 of the electromagnetic pump 100 with the oil passage 68 of the input port 112 of the linear solenoid SLC1. Thus, pressure-feeding operation oil from the electromagnetic pump 100 causes hydraulic pressure to act on the clutch C1. Next, when the automatic start conditions are satisfied and the stopped engine 12 automatically starts, the mechanical oil pump 42 also operates accordingly to supply the line pressure PL. The spool 74 of the switching valve 70 communicates the oil passage 64 of the D-position output port 92b of the manual valve 90 with the oil passage 68 of the input port 112 of the linear solenoid SLC1, and cuts off communication between the oil passage 62 of the discharge port 104 of the electromagnetic pump 100 and the oil passage 68 of the input port 112 of the linear solenoid SLC1. In such case, the line pressure PL input through the D-position output port 92b of the manual valve 90 is regulated by the linear solenoid SLC1 and supplied to the clutch C1, such that the clutch C1 becomes completely engaged and starts the vehicle moving. By driving the electromagnetic pump 100 so that hydraulic pressure acts on the clutch C1 while the engine 12 is automatically stopped, the clutch C1 can be rapidly engaged by the linear solenoid SLC1 immediately after the engine 12 automatically restarts. Therefore, the vehicle can smoothly start off as the result of automatic starting of the engine 12. Note that in this embodiment, the electromagnetic pump 100 is set so as to pressure feed an amount of operation oil capable of replenishing only an amount of operation oil leakage from a seal ring or the like provided between the piston and drum of the clutch C1.

The penetration or the like of foreign matter while the shift lever 81 is in the D position and the engine 12 is automatically stopped may lead to a situation where the spool 74 of the switching valve 70 is stuck (locked) in the position shown in the right-hand region of FIG. 4. In this situation, even if the automatic start conditions of the engine 12 are subsequently satisfied and the line pressure PL acts on the signal pressure input port 72a of the switching valve 70, the spool 74 does not move. Therefore, communication between the oil passage 64 of the D-position output port 92b of the manual valve 90 and the oil passage 68 of the input port 112 of the linear-solenoid SLC1 remains cut off, and the oil passage 62 of the discharge port 104 of the electromagnetic pump 100 remains in communication with the oil passage 68 of the input port 112 of the linear solenoid SLC1. In other words, residual pressure continues to act on the clutch C1. Shift-operating the shift lever 81 from the D position to the N position at such time de-energizes the linear solenoid SLC1, which closes the input port 112 of the linear solenoid SLC1 and communicates the output port 114 with the drain port 116. Therefore, the residual pressure acting on the clutch C1 is drained through the output port 114 and the drain port 116 of the linear solenoid SLC1. Thus, even if the switching valve 70 sticks, when the shift lever 81 is operated to the N position power from the engine 12 is not transmitted to the drive shaft 97 due to the residual pressure of the clutch C1. In other words, even if the switching valve 70 sticks, power unexpected by the driver is not transmitted to the drive shaft 97. The linear solenoid SLC1 is connected between the switching valve 70 and the clutch C1 for this reason. When the automatic start conditions of the engine 12 are satisfied and the shift lever 81 is shift-operated to the D position while the spool 74 of the switching valve 70 is stuck, operation oil output from the D-position output port 92b of the manual valve 90 to the oil passage 64 can be supplied to the oil passage 68 of the input port 112 of the linear solenoid SLC1 through the bypass valve 66, which bypasses the switching valve 70. Therefore, even if the switching valve 70 sticks, the clutch C1 can be engaged to transmit power to the drive shaft. In other words, even if the switching valve 70 sticks, an emergency maneuver such as stopping the vehicle on the road shoulder, for example, can be performed. The bypass valve 66 is provided for this reason.

According to the power transmission device 20 of the embodiment described above, the switching valve 70 is formed so as to selectively switch between communicating the input port 72b connected to the discharge port 104 of the electromagnetic pump 100 with the output port 72d connected to the input port 112 of the linear solenoid SLC1, and communicating the input port 72c connected to the D-position output port 92b of the manual valve 90 with the output port 72d. The linear solenoid SLC1 is formed so as to regulate operation oil that is input through the input port 112 and outputs the operation oil from the output port 114 to the clutch C1 by discharge to the drain port 116. Therefore, de-energizing the linear solenoid SLC1 puts the output port 114 and the drain port 116 of the linear solenoid SLC1 in communication such that hydraulic pressure acting on the clutch C1 can be drained. Therefore, even if the switching valve 70 sticks due to some abnormality during an automatic stop of the engine 12, when the engine 12 subsequently restarts and a shift operation is made to the N position, the linear solenoid SLC1 is de-energized. Consequently, the residual pressure of the clutch C1 can suppress the transmission of power from the engine 12 to the drive shaft 97. Furthermore, the bypass valve 66 is provided for bypassing the switching valve 70 and supplying operation oil from the D-position output port 92b of the manual valve 90 to the linear solenoid SLC1. Therefore, even if the switching valve 70 sticks, when the shift lever 81 is shift-operated to the D position, the clutch C1 can be engaged to transmit power to the drive shaft 97 for an emergency maneuver. As a consequence, abnormalities of the switching valve 70 can be suitably counteracted to increase the reliability of the power transmission device 20.

Although the power transmission device 20 of the embodiment is provided with the bypass valve 66 that bypasses the switching valve 70 and delivers operation oil to the linear solenoid SLC1, the power transmission device 20 may not be provided with this. However, the bypass valve 66 is preferably provided to enable an emergency maneuver if the switching valve 70 sticks.

In the power transmission device 20 of the embodiment, the linear solenoid SLC1 is formed as a normally closed type. However, the linear solenoid SLC1 may be formed as a normally open type.

The power transmission device 20 of the embodiment incorporates a five-speed automatic transmission 30 with first to fifth forward speeds. However, the present invention is not limited to this example, and the power transmission device 20 may incorporate an automatic transmission with any number of speeds, such as a four-speed, six-speed, or eight-speed automatic transmission.

Here, the correspondence relation will be described between main elements in the embodiment and main elements of the invention as listed in the Summary of the Invention. In the embodiment, the engine 12 corresponds to a "motor"; the mechanical oil pump 42 to a "first pump"; the electromagnetic pump 100 to a "second pump"; the linear solenoid SLC1 to a "pressure regulating valve"; and the switching valve 70 to a "switching valve". Here, the motor is not limited to an internal combustion engine that outputs power using a hydrocarbon fuel such as gasoline or diesel. The motor may be any type of internal combustion engine, such as a hydrogen engine, or any type of motor capable of power output, such as an electric motor other than an internal combustion engine. In addition, the electromagnetic pump is not limited to one that pressure feeds operation fluid to the clutch C1, which forms the first forward speed, when functioning as an electromagnetic pump. For example, when a shift speed other than the first forward speed (such as the second forward speed) is set at start-off based on a driver instruction or the running condition, the second pump may pressure feed operation oil to a clutch or brake that forms this speed. Note that with regard to the correspondence relation between the main elements of the embodiment and the main elements of the invention as listed in the Summary of the Invention, the embodiment is only an example for giving a specific description of a best mode for carrying out the invention explained in the Summary of the Invention. This correspondence relation does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a mode for carrying out the present invention. However, the present invention is not particularly limited to such an example, and may obviously be carried out using various embodiments without departing from the scope of the present invention.

The present invention may be used in the automobile industry and the like.

What is claimed is:

1. A power transmission device installed in a vehicle, comprising:
   a clutch that transmits power from a motor to an axle;
   a first pump that is driven by power from the motor to generate and output fluid pressure;
   a second pump that receives and is driven by a supply of electric power to generate and output fluid pressure;
   a pressure regulating valve that functions as a linear solenoid valve and is formed with an input port, an output port that is connected to the clutch, and a drain port;
   a switching valve that switches between a first connection state, wherein when the first pump is driving, operation fluid output from the first pump is supplied to the input port of the pressure regulating valve and a supply of operation fluid from the second pump to the input port of the pressure regulating valve is cut off, and a second connection state wherein, when the first pump is not driving, the supply of operation fluid from the first pump to the input port of the pressure regulating valve is cut off and operation fluid output from the second pump is supplied to the input port of the pressure regulating valve; and
   a bypass valve that supplies operation fluid output from the first pump to the input port of the pressure regulating valve without going through the switching valve.

2. The power transmission device according to claim 1, wherein
   the switching valve comprises:
   signal pressure input port that is input with operation fluid output from the first pump as a signal pressure;
   first input port that is input with operation fluid output from the first pump;
   a second input port that is input with operation fluid output from the second pump; and
   an output port that is connected to the input port of the pressure regulating valve and outputs operation fluid, wherein
   when operation fluid is input to the signal pressure input port, as the first connection state, the first input port communicates with the output port, and communication between the second input port and the output port is cut off, and
   when operation fluid is not input to the signal pressure input port, as the second connection state, communication between the first input port and the output port is cut off, and the second input port communicates with the output port.

3. The power transmission device according to claim 1, wherein
   the second pump is an electromagnetic pump that generates fluid pressure using electromagnetic force.

4. The power transmission device according to claim 1, wherein
   the motor is an internal combustion engine capable of an automatic stop and an automatic start.

5. A vehicle provided with
   a motor, and
   the power transmission device according to claim 1.

* * * * *